US012604063B2

(12) United States Patent
Panchaksharaiah et al.

(10) Patent No.: US 12,604,063 B2
(45) Date of Patent: *Apr. 14, 2026

(54) SYSTEMS AND METHODS FOR CUSTOMIZING A MEDIA PROFILE PAGE

(71) Applicant: Adeia Guides Inc., San Jose, CA (US)

(72) Inventors: Vishwas Sharadanagar Panchaksharaiah, Tiptur (IN); Srikanth Channapragada, Bangalore (IN); Pooja Srivastava, Bengaluru (IN); Harsha Neerakani, Puttur (IN); Gyanveer Singh, Bangalore (IN); Cato Yang, San Jose, CA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 349 days.

This patent is subject to a terminal disclaimer.

(21) Appl. No.: 18/504,575

(22) Filed: Nov. 8, 2023

(65) Prior Publication Data

US 2024/0155200 A1 May 9, 2024

Related U.S. Application Data

(63) Continuation of application No. 17/855,364, filed on Jun. 30, 2022, now Pat. No. 11,856,268.

(51) Int. Cl.
| | |
|---|---|
| *H04N 21/482* | (2011.01) |
| *G06T 11/60* | (2006.01) |
| *H04N 21/472* | (2011.01) |

(52) U.S. Cl.
CPC ......... *H04N 21/4826* (2013.01); *G06T 11/60* (2013.01); *H04N 21/472* (2013.01)

(58) Field of Classification Search
CPC ... H04N 21/4826; H04N 21/472; G06T 11/60
See application file for complete search history.

(56) References Cited

U.S. PATENT DOCUMENTS

| | | | |
|---|---|---|---|
| 11,856,268 B1 | 12/2023 | Panchaksharaiah et al. | |
| 2004/0205498 A1* | 10/2004 | Miller ................... | G06F 40/106 |
| | | | 715/202 |
| 2008/0163059 A1 | 7/2008 | Craner | |
| 2008/0276279 A1* | 11/2008 | Gossweiler ........ | H04N 21/4668 |
| | | | 725/46 |

(Continued)

*Primary Examiner* — Kunal Langhnoja
(74) *Attorney, Agent, or Firm* — HG LAW LLP

(57) ABSTRACT

Systems and methods are provided for customizing a profile page. A first user profile and a second user profile are accessed by a computing device. First and second pluralities of content items associated with the first and second user are identified. Based on the first and second user profiles, first and second subsets of content items of the first and second plurality of content items are selected. For each content item of the first subset of content items, an image associated with the content item is identified. For each content item of the second subset of content items, an image associated with the content item is identified. Based on the identified images, first and second image collages are generated for the first and second user profiles. The first and second image collages and first and second indicators corresponding to the first and second user profiles are generated for display.

20 Claims, 10 Drawing Sheets

(56)          References Cited

U.S. PATENT DOCUMENTS

| | | | |
|---|---|---|---|
| 2013/0061266 A1* | 3/2013 | Chai | H04N 21/47205 |
| | | | 725/41 |
| 2013/0262575 A1* | 10/2013 | Xiong | H04N 21/47202 |
| | | | 709/204 |
| 2014/0304741 A1* | 10/2014 | Hamano | G06F 21/6218 |
| | | | 725/46 |
| 2015/0237402 A1* | 8/2015 | Lee | H04N 21/4826 |
| | | | 725/46 |
| 2015/0245107 A1* | 8/2015 | Klappert | H04N 21/4755 |
| | | | 725/45 |
| 2019/0332709 A1* | 10/2019 | Peng | G06F 16/248 |
| 2023/0196478 A1* | 6/2023 | Doken | H04N 21/4788 |
| | | | 705/319 |
| 2024/0007716 A1 | 1/2024 | Panchaksharaiah et al. | |
| 2024/0020603 A1* | 1/2024 | Levin | G06Q 10/0833 |

* cited by examiner

SYSTEMS AND METHODS FOR CUSTOMIZING A MEDIA PROFILE PAGE

CROSS-REFERENCE TO RELATED APPLICATIONS

This is a continuation application of U.S. patent application Ser. No. 17/855,364, filed Jun. 30, 2022, the disclosures of the which are hereby incorporated by reference herein in their entireties.

BACKGROUND

The present disclosure is directed towards systems and methods for adjusting and/or customizing a profile page where a plurality of user profiles are provided on a single landing page. In particular, systems and methods are provided herein that adjust and/or customize a profile page based on generating an image collage from identified content items.

SUMMARY

The proliferation of content item delivery services, including over-the-top (OTT), streaming and video on demand (VOD) services, such as Netflix, Amazon Prime Video, Disney+ and Hulu, affords consumers of content items more choice than ever before. A user typically accesses a content item delivery service via a user profile. Typically, a user signs in to the content item delivery service via an application running on a computing device such as a smart television, smartphone and/or tablet. At a future time, a selectable icon may enable a user to access the content item delivery service without reentering their details. Content item delivery services may provide tailored recommendations to users, based on their consumption history. Relevant recommendations can have the benefit of reducing usage of network bandwidth, storage resources and/or processing resources. This is achieved by reducing the number of times that a user skips from content item to content item, when looking for something to consume, and hence enables a reduction in the transmission of additional content that is not relevant. However, it is not easy for a consumer to share a summary of what content items they have been consuming with other users and, in particular, other users who use the content item delivery service on the same computing device. Existing sharing systems tend to be manual, reliant on text links and limited to a single content item, or series of content items. This can mean that other users may access user profiles other than their own, in order to see what content items have been consumed. For example, Alice may access Bob's profile to see what Bob has been watching. In addition, users may start consuming other content items while still signed in to the other user profile. For example, Alice may start streaming episodes of a series that Bob does not watch. This can reduce the relevance of any recommendations. For example, when Bob accesses the content item delivery service, he may receive recommendations based on Alice's viewing.

To overcome these problems, systems and methods are provided herein for adjusting and/or customizing a profile page. In particular, systems and methods are provided herein that adjust and/or customize a profile page based on generating an image collage from identified content items.

Systems and methods are described herein for adjusting and/or customizing a profile page. In accordance with some aspects of the disclosure, a method is provided. A first user profile and a second user profile are accessed by a computing device. A first plurality of content items associated with the first user profile are identified, and a second plurality of content items associated with the second user profile are identified. A first subset of content items of the first plurality of content items and a second subset of content items of the second plurality of content items are selected based on the first user profile and the second user profile. For each content item of the first subset of content items, an image associated with the content item is identified, and for each content item of the second subset of content items, an image associated with the content item is identified. A first image collage for the first user profile and a second image collage for the second user profile are generated based on the identified images. The first and second image collages, a first indicator corresponding to the first user profile, and a second indicator corresponding to the second user profile are generated for display.

In an example system, a user opens an OTT application, such as a Netflix application, on, for example, a smart television. On opening the OTT application, the smart television displays a profile page to the user, which displays a number of selectable icons corresponding to user profiles. In addition to the selectable icons, the smart television displays image collages for each of the user profiles. The image collages are generated by identifying a plurality of content items that have been consumed while signed in via one of the user profiles. For example, a selection of movies and episodes may have been consumed. Images associated with the identified movies and episodes are identified, for example via a webservice, and the image collage is generated based on the identified images, for example by tiling the identified images in a rectangular shape. The image collage may be associated with the user profile icon, for example, the image collage may surround the user profile icon.

An input may be received at the computing device, a user associated with the input may be identified and a preference associated with the first user may be accessed. The preference may indicate a type of content item to be excluded from the first image collage. Selecting the first subset of content items may comprise selecting the first subset of content items based on the preference. A user may be associated with the first user profile, and a hierarchy associated with the first user profile and the second user profile may be identified. It may be identified whether the user associated with the first user profile is proximate to the computing device and, on identifying that the user is proximate to the computing device, one of the first or second image collages may be hidden based on the hierarchy. For each content item of the first plurality of content items, an associated consumption duration may be determined. Each determined consumption duration may be compared to a threshold value. Selecting the first subset of content items may be further based on the respective consumption duration of a content item exceeding the threshold value.

A shared content item that is in both the first and the second subset of content items may be identified, and the image associated with the shared content item may be divided into three portions. The first image collage may be generated based on a first portion of the image, and the second image collage may be generated based on a second portion of the image. The first image collage, the second image collage and a third portion of the image may be arranged to reproduce the image associated with the shared content item.

A season and/or episode identifier, such as a number, may be accessed based on a content item of the first subset of content items, and an indication of the season and/or episode identifier may be generated. The first image collage may be generated based on the indication of the season and/or episode identifier. Data associated with progress through a content item may be accessed via the user profile and based on a content item of the first subset of content items, and a progress indicator may be generated based on the data. The first image collage may be generated based on the progress indicator. A screenshot of a portion of the content item may be generated based on a content item of the first subset of content items. The first image collage may be generated on the screenshot. A ranking for each content item of the first subset of content items may be determined and, based on the determined rankings, a size for each of the identified images may be identified. The image collage may be generated based on the identified size for each of the identified images.

The first and second user profiles may be associated with a social media website and a content item delivery service, and input associated with generating new content on the social media website may be received at the social media website and associated with the first user profile. The input associated with generating new content may comprise an indication of a mention of the second user profile and the content item delivery service. Identifying the first and second plurality of content items may be based on the mention of the content item delivery service. Generating the user profile indicators and image collages for display may comprises generating, for each of the user profiles, a user profile indicator, an image collage and the new content for display on the social media website.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
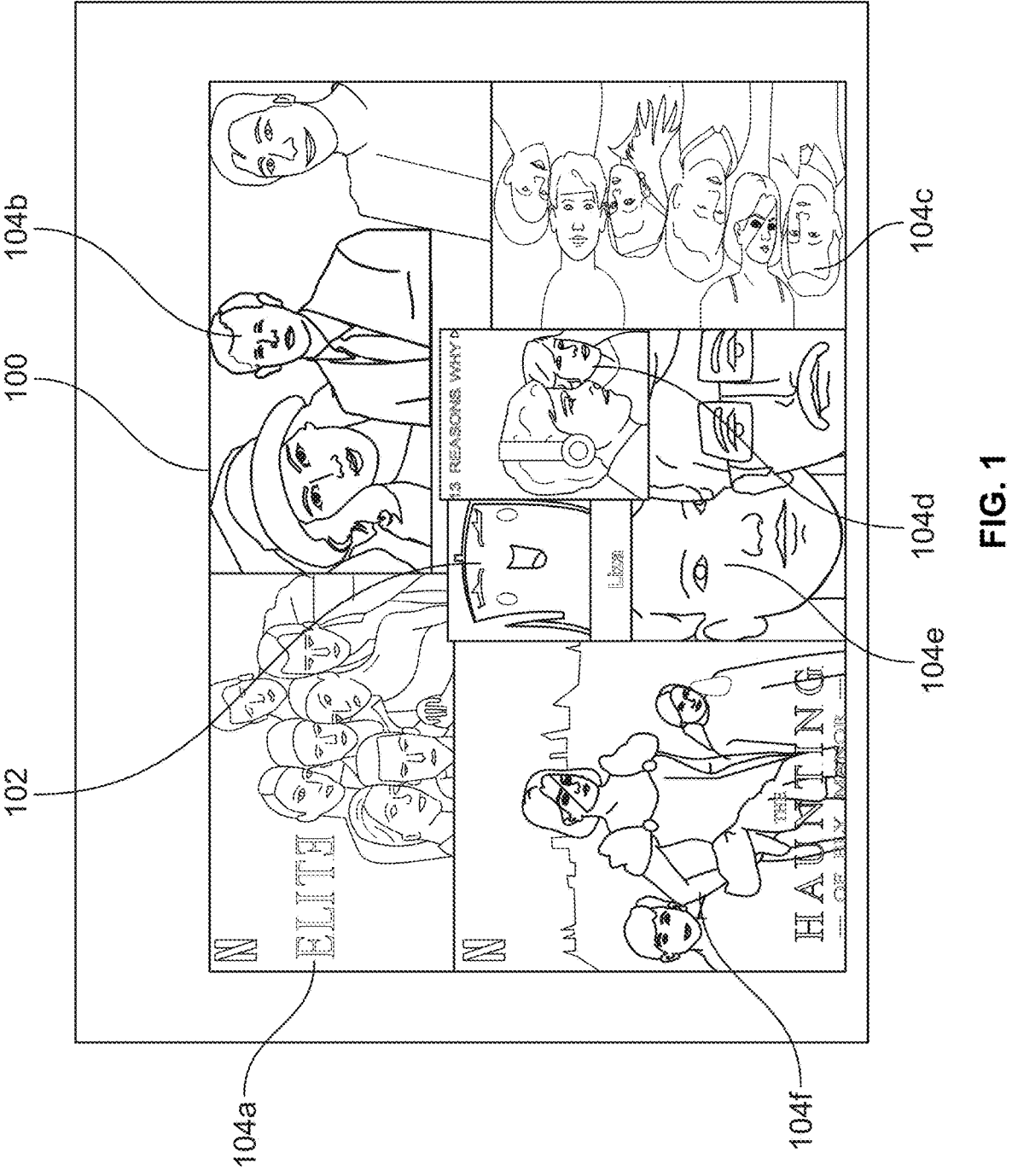
FIG. 1 shows an example image collage, in accordance with some embodiments of the disclosure.

Systems and methods are described herein for adjusting and/or customizing a profile page. A profile page is any generated page, screen, or similar, via which a selectable icon, or representation, associated with a user profile is displayed. A user profile is any collection of settings, data and/or information associated with a specific login to a service, such as a content item delivery service. A user profile may be populated manually and/or automatically. Data contained in the user profile may remain static or may be updated dynamically in response to, for example, user actions.

A content item includes audio, video, text and/or any other media content. A content item may be a single media content item; in other examples it may be a series (or season) of episodes of media content items. Audio includes audio-only content, such as podcasts. Video includes audiovisual content such as movies and/or television programs. Text includes text-only content, such as event descriptions. One example of a suitable media content item is one that complies with the MPEG DASH standard. An OTT, streaming and/or VOD service (or platform) may be accessed via a website and/or an app running on a computing device and may receive any type of content item, including live content items and/or on-demand content items. Content items may, for example, by streamed to physical computing devices. In another example, content items may, for example, be streamed to virtual computing devices in, for example, a virtual environment and/or the metaverse.

An image includes any image file type including Portable Network Graphics (PNG), Joint Photographic Experts Group (JPEG), Graphic Interchange Format (GIF), Tagged Image File Format (TIFF) and RAW image file types. Images may be static or may comprise animations. An image collage is any selection of images that is purposely arranged. An image collage may form a regular shape, such as a square and/or a rectangle. In other examples, an image collage may form an irregular shape. An image collage may be formed of images that are of the same, or similar, sizes. In another example, an image collage may be formed of images that are of different sizes. An image collage may comprise information in addition to the images, for example, text indicating a title, genre, season identifier, such as a number, and/or episode identifier, such as a number, associated with a content item. In another example, an image collage may comprise an indication of progress associated with a content item.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an example image collage, in accordance with some embodiments of the disclosure. Image collage 100 is associated with a selectable user profile icon 102 and name. The image collage 100 is arranged around the user profile icon 102 in a rectangular manner. The image collage comprises images 104a, 104b, 104c, 104d, 104e 104f, each of which is associated with a different content item. Each of the images 104a, 104b, 104c, 104d, 104e 104f is a different size. The size may be based on how best to collage the images in a regular shape. In other examples, the size may be based on a rating system.

Figure 2:
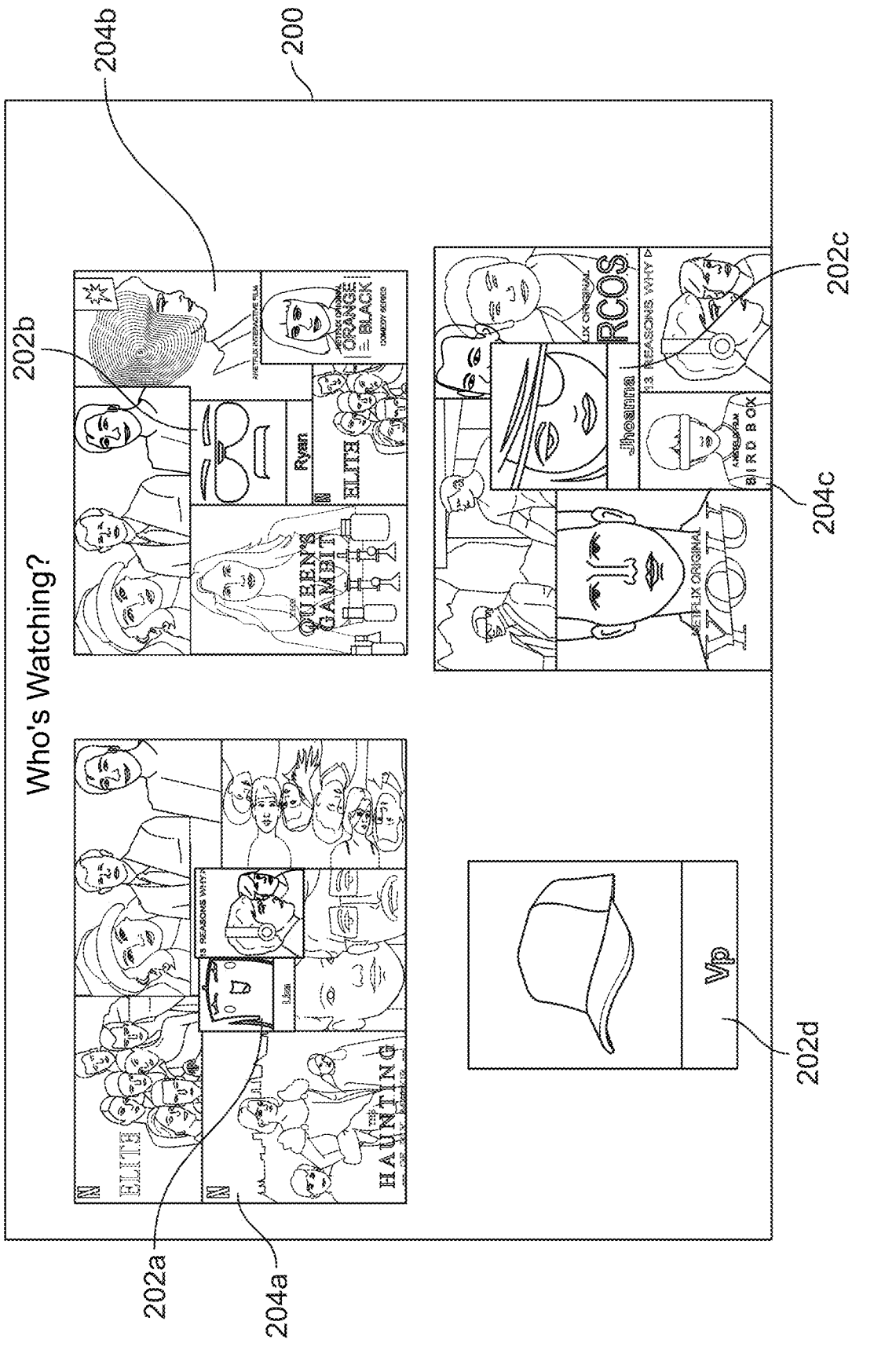
FIG. 2 shows an example customized profile page, in accordance with some embodiments of the disclosure.

FIG. 2 shows an example customized profile page, in accordance with some embodiments of the disclosure. Profile page 200 comprises four selectable user profile icons 202a, 202b, 202c 202d and associated names. Image collages 204a, 204b, 204c are arranged around user profile icons 202a, 202b, 202c. In this example, user profile icon 202d does not have an image collage associated with it. In some examples, a preference, or setting, may be associated with a user profile that enables the display of an image collage associated with a profile icon.

Figure 3:
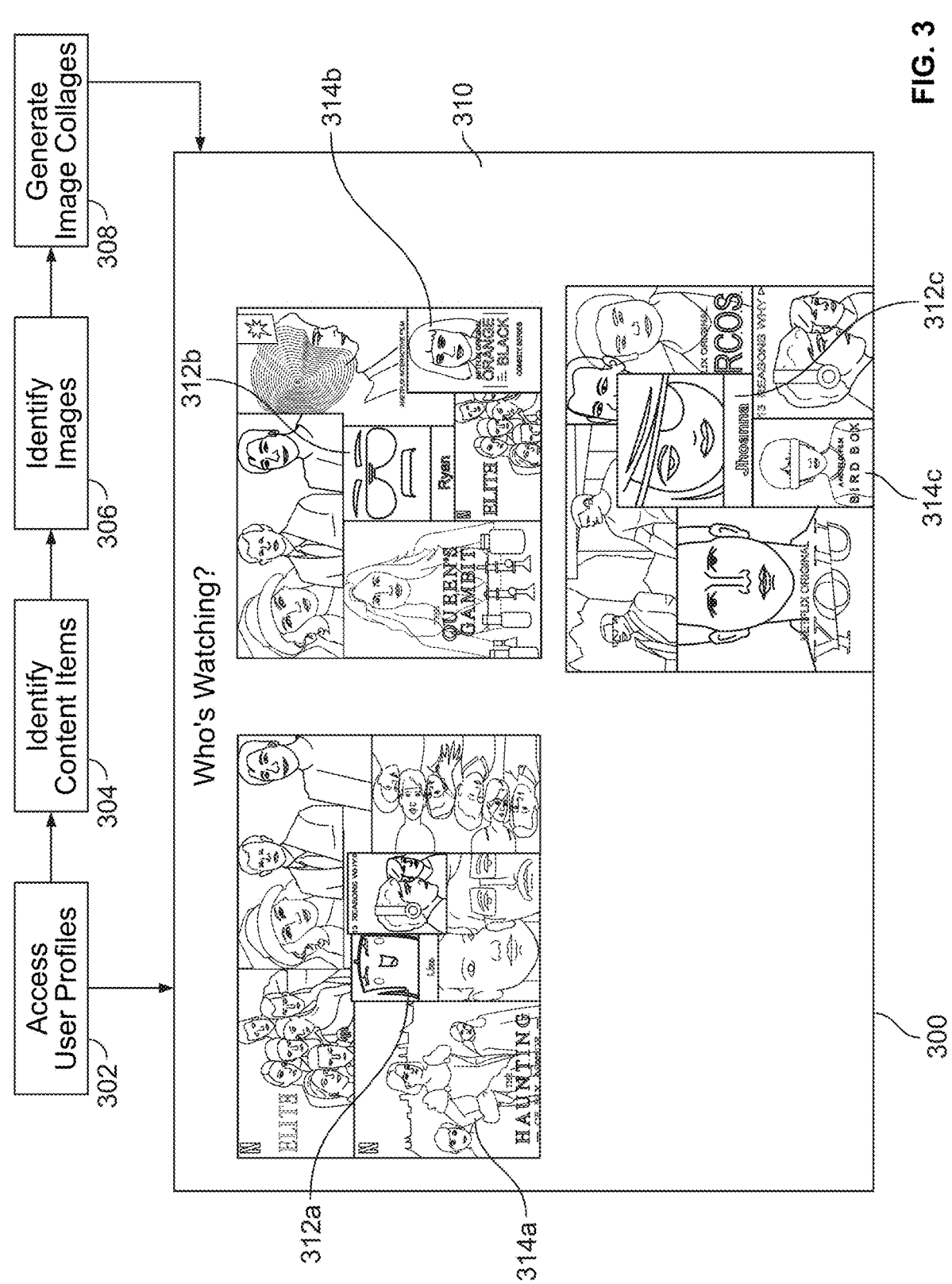
FIG. 3 shows an example environment in which a profile page is customized, in accordance with some embodiments of the disclosure.

FIG. 3 shows an example environment in which a profile page is customized, in accordance with some embodiments of the disclosure. The environment comprises smart television 300, though in other examples the smart television may be any suitable computing device including, for example, a smartphone, a laptop and/or a tablet device. On opening a content item delivery service, such as Netflix, a plurality of user profiles are accessed 302. The user profiles may be stored locally on the smart television 300 or, in other examples, the user profiles may be stored remote from the smart television and accessible via a network, such as the internet, as described below in connection with FIG. 4.

On accessing the user profiles, content items are identified 304 for each of the user profiles. Typically, these are content items, such as films and/or episodes, that have been consumed while a user is logged into a content item delivery service with a user profile. In some examples, the content items may be identified via, for example, generated metadata from the content item delivery service application, or metadata accessed from a webservice and/or via an Application Programming Interface (API). In some examples, content items may be identified by sending a clip of the content item, or a part of the content item, to a content item recognition service. In other examples, a trained algorithm may automatically identify suitable content items. In some examples, content items that are identified as being "binge-watched" may be prioritized for inclusion in an image collage. In other examples, content items may be identified and/or prioritized based on a link between the user profile and a particular content item and/or actor. This link may be, for example, a "like" for a particular content item and/or actor, an alert and/or reminder for a particular content item, a content item that has been added to a watchlist, and/or based on whether a particular content item is trending. In some examples, only a fixed number of content items may be identified, for example, three, six, eight and/or ten content items, so that the image collage does not become too large and/or crowded. In other examples, a large number of content items may be identified, resulting in a large image collage and/or an image collage comprising relatively small images. On identifying the content items for each of the user profiles, images associated with the content items are identified 306. For example, images may be identified via a webservice, via scraping a website, via identifying thumbnails already present in the content delivery item application and/or via a captured screenshot of a content item. Images may include, for example, an advertising poster for a content item. Further examples of different images and/or information that may be included in an image collage are discussed in more detail below.

On identifying the images associated with the identified content items, image collages for each of the user profiles are generated 308. In one example, the identified images are arranged such that, for example, at least two borders of an image are each in contact with a boarder of another image. In other examples, constraints on the shape of the image collage are met, for example a square, a rectangular, any regular shape and/or any irregular shape. In some examples, constraints on the size of the image collage are met. These may be a relative size, for example not to exceed 10% of the screen of the smart television 300. In other examples, the size may be a set number of pixels, for example 350 by 180 pixels. In some examples, the images may overlap in an image collage. In other examples, the images may not overlap, and any gaps may be filled in with a background color, such as black. In some examples, the images may move within the image collage, for example all the images may move in a circular motion around a center point. In another example, the individual images may move, or rotate, around individual fixed axes. In other examples, the images may be sized to produce an image collage of a size that enables a consistent boarder region around an image collage with respect to the other image collages on the profile page.

At the smart television 300, a user profile page 310, comprising icons 312a, 312b, 312c representing the user profiles and the generated image collages 314a, 314b, 314c are generated for display, thereby enabling a user to easily see a summary of what content items the different user profiles have been consuming.

In some examples, one or more images in the generated image collages may be selectable via a user input, for example, via a command issued from a remote control and/or via a touch event on a touchscreen of a computing device. On receiving an input, for example, an OTT application may generate a suitable section of the application for display. For example, if an image in an image collage corresponds to the series "Orange is the New Black" then, on receiving an input selecting that image, the OTT application may generate a section for display that enables the user to navigate through episodes and/or watch episodes of "Orange is the New Black." In some examples, this functionality may be achieved via deep-linking one or more images of the image collages to, for example, a series page, or section, of an OTT application. In some examples, the content item may start playing, or resuming, in response to an input command selecting the image.

In some examples, a user may be associated with a first user profile; however, the user may wish to consume a content item associated with an image of the image collage of a second user profile. To address this situation, in some examples, a user may be presented with an option to view a content item that is associated with a selected image of an image collage with a profile that is not associated with that image collage. Such an option may always be presented to the user on selection of an image of an image collage, for example by listing all the profiles that are available for consuming, or resuming, the content item. In another example, the user may be able to access such an options menu via a long press of a button on a remote control and/or via a long touch on a touchscreen of a computing device. In other examples, such an options menu may be accessible via an assigned button of an input device and/or combination of buttons.

In some examples, a subset of the identified content items may be selected based on the time of day, such that the image collage comprises time appropriate images. For example, a user profile may indicate that a user normally watches "The Queen's Gambit" in the morning and "Orange is the New Black" in the evening. In this example, an image associated with "The Queen's Gambit" may be selected for inclusion in an image collage in the morning, and an image associated with "Orange is the New Black" may be selected for inclusion in an image collage in the evening. In a similar manner, a user profile may indicate that certain content items are consumed in different seasons (e.g., "Narcos" may generally be consumed in the summer and "You" may be generally consumed in the winter), during festive and/or religious periods (e.g., Christmas and/or Ramadan), and/or in correlation with the weather and/or climate (e.g., "Elite" may be generally consumed when it is cold and/or "Friends" may generally be consumed when it is sunny). In a similar manner, images associated with the relevant programs may be selected for inclusion in an image collage in similar seasons, festive and/or religious periods, and/or similar weather. Season, festive, religious and/or weather data may be accessed via a web service and may be stored in a user profile in association with content item consumption data.

In another example, the number of images and/or the size of the images that make up the image collage may depend on the size of a display for which the image collage is being generated for display. For example, a mobile computing device, such as a smartphone, may comprise a relatively small display. In this example, an image collage comprising relatively few images (including one image) may be generated for display on the display of the smartphone. In another example, a computing device with a relatively large display, for example, a smart television, may have an image collage comprising a relatively large number of images generated for display. Display size may be measured by a total number of pixels of a display and/or by the physical size of the display.

Figure 4:
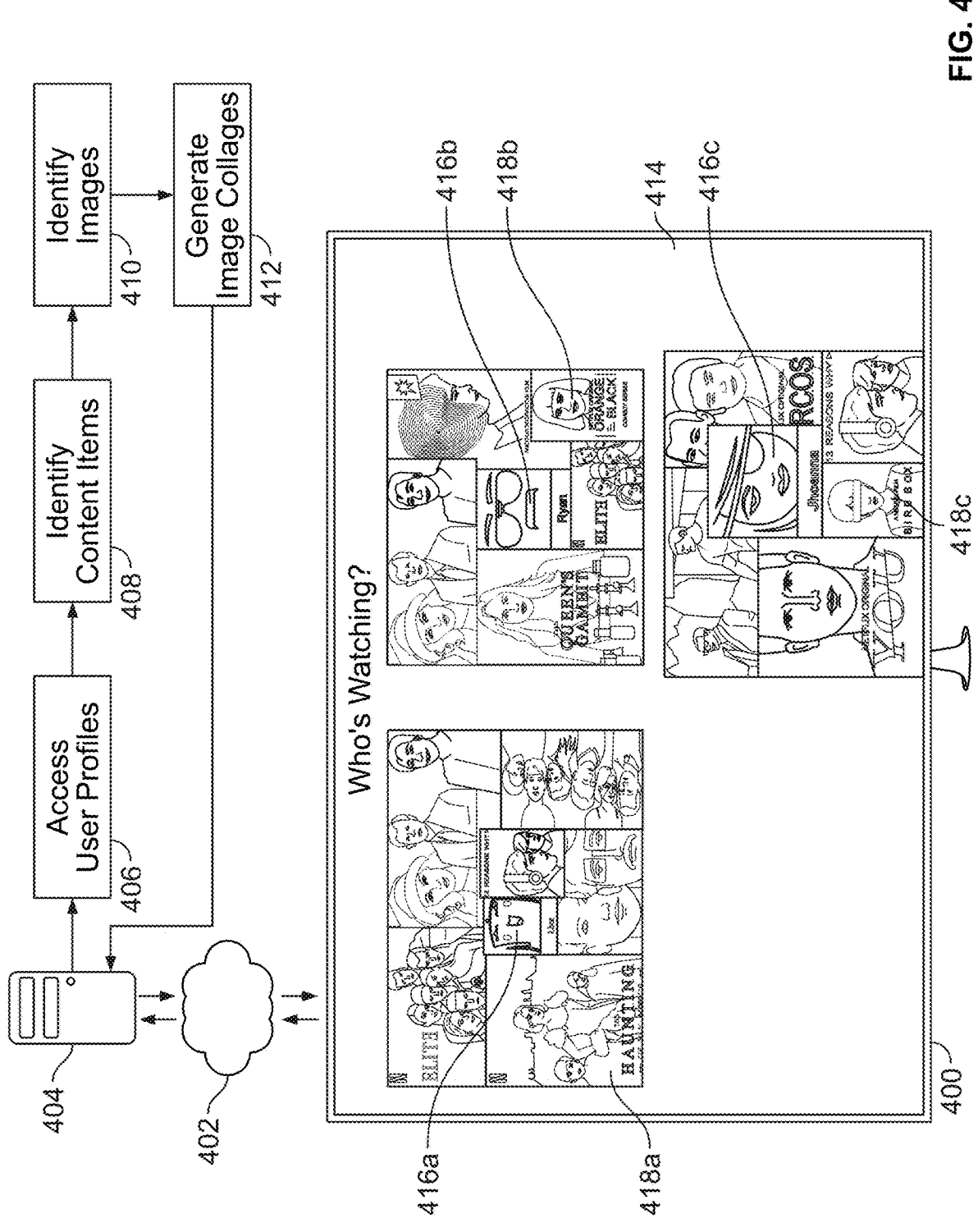
FIG. 4 shows another example environment in which a profile page is customized, in accordance with some embodiments of the disclosure.

FIG. 4 shows another example environment in which a profile page is customized, in accordance with some embodiments of the disclosure. In a similar manner to the environment discussed in connection with FIG. 3, the environment includes a smart television 400, at which a profile page 414, comprising icons 416a, 416b, 416c representing user profiles and generated image collages 418a, 418b, 418c, is displayed. On accessing a content item delivery service at the smart television 400, a command is transmitted from the smart television 400, via a network 402, such as the internet, to a server 404. The network 402 may comprise wired and/or wireless means. User profiles are accessed 406 at the server 404. In a similar manner to that discussed in connection with FIG. 3, content items are identified 408 for each of the user profiles, images associated with the content items are identified 410 and images collages are generated 412. The generated image collages are transmitted from the server 404, via network 402, to the smart television 400, where they are generated for display on the profile page 414, with the icons 416a, 416b, 416c. The server 404 may comprise a single physical or virtual server. In other examples, the process associated with accessing 406 the user profiles, identifying 408 the content items, identifying 410 the images and generating 412 the image collages may take place on different physical or virtual servers. In some examples, any content item subsequently accessed via the content item delivery service may be transmitted from the same server 404 that is used to perform any of the aforementioned processes 406, 408, 410, 412. In other examples, the content item may be transmitted from a different server to a server that is used to perform any of the aforementioned processes 406, 408, 410, 412.

Figure 5:
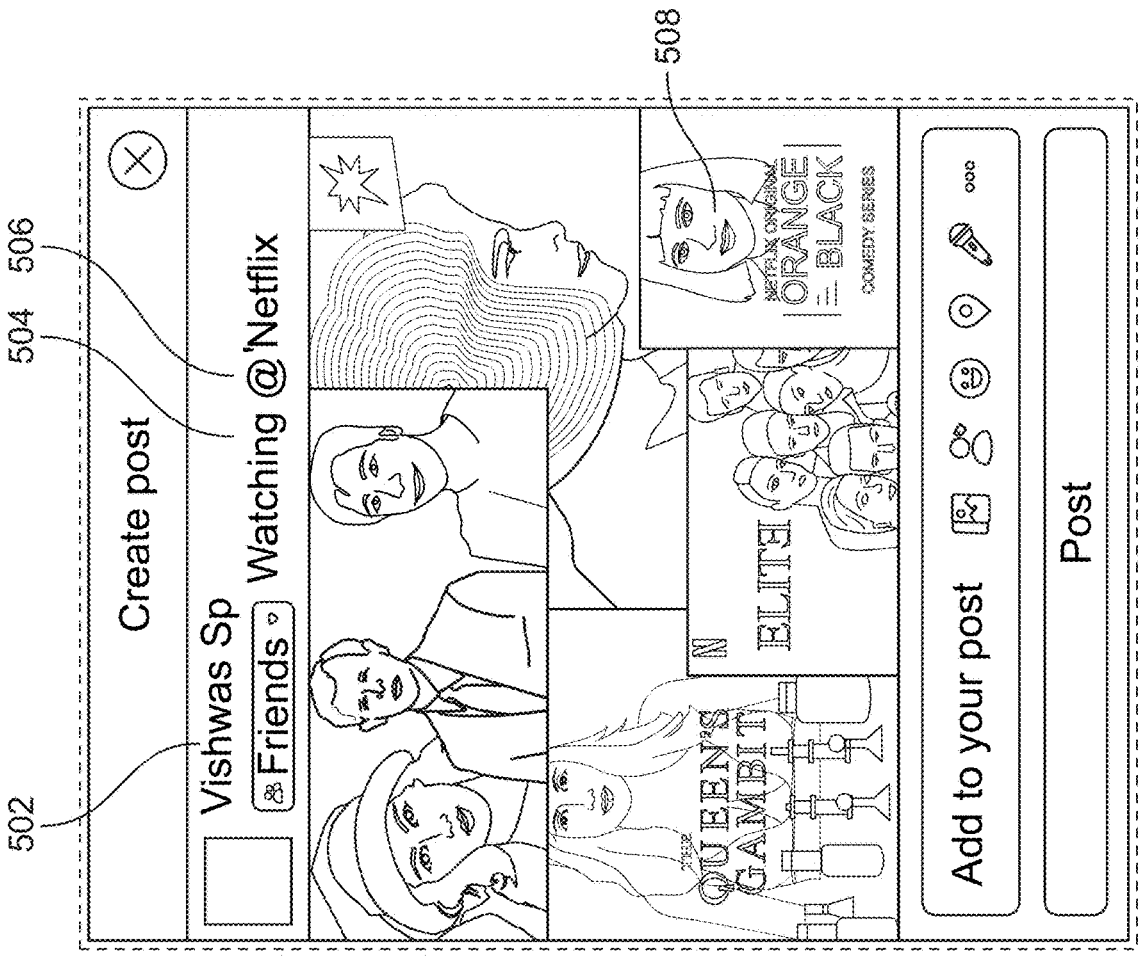
FIG. 5 shows another example environment in which a profile page is customized, in accordance with some embodiments of the disclosure.
Figure 5:
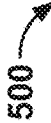

FIG. 5 shows another example environment in which a profile page is customized, in accordance with some embodiments of the disclosure. A social media site 500, for example, Facebook, may be accessed via a computing device, for example, via a web browser running on a laptop and/or an application running on a smartphone. The social media site has a social media profile 502 associated with it. For example, a user may log on to social media site 500 via a user profile. A user using the social media site 500 may post information comprising, for example, comments and photos via the social media website such that other users, including friends and/or general users, may be able to read their social media posts via their viewing session, for example, on a different computing device. When receiving input 504 associated with generating a post that comprises a mention 506 of a content item delivery service, indicated in this example by the "@" symbol, the social media platform may access a user profile associated with the content item delivery service. In some examples, the user profile may be the same user profile that is used to log on to the social media website 500. In other examples, the user profile may be a separate user profile that is linked to the social media website 500. In response to identifying the mention of the content item delivery service, content items associated with the user profile may be identified, images associated with the content items are identified and images collages are generated. These steps may take place at servers associated with the social media website. For example, the content item delivery service may provide a simple list, for example via an Extensible Markup Language (XML) file, of relevant content items that are associated with the user profile. The steps of identifying images associated with the content items and generating the image collages may be performed at the servers associated with the social media website. In another example, the content item delivery service may have an API associated with it that enables the social media website to request an image collage that is, for example, pre-generated or generated on the fly. The generated image collage 508 is included in the user's post to the social media website 500.

Figure 6:
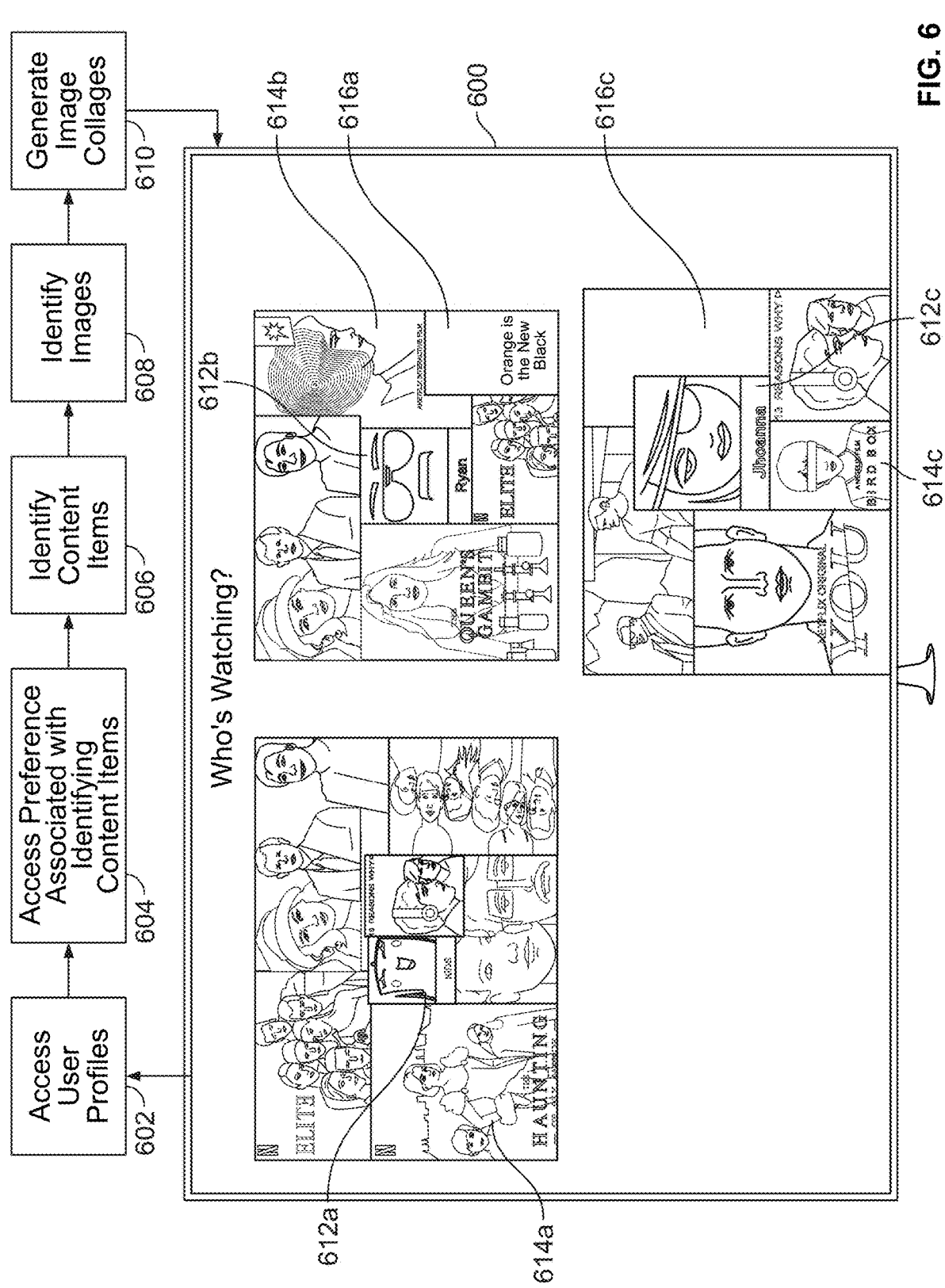
FIG. 6 shows another example environment in which a profile page is customized, in accordance with some embodiments of the disclosure.

FIG. 6 shows another example environment in which a profile page is customized, in accordance with some embodiments of the disclosure. The environment comprises smart television 600, though in other examples the smart television may be any suitable computing device including, for example, a smartphone, a laptop and/or a tablet device. On opening a content item delivery service, such as Netflix, a plurality of user profiles are accessed 602. The user profiles may be stored locally on the smart television 600 or, in other examples, the user profiles may be stored remote from the smart television and accessible via a network, such as the internet, as described above in connection with FIG. 4. On accessing the user profiles, a preference associated with identifying content items is accessed 604. For example, preferences include whether to include only "children-friendly" content items, whether to include text for one or more content items (rather than images), and/or whether to exclude a content item for display. Content items are identified 606 for each of the user profiles. On identifying the content items for each of the user profiles, images associated with the content items are identified 608. On identifying the images associated with the identified content items, image collages for each of the user profiles are generated 610. At the smart television 600, a user profile page comprising icons 612a, 612b, 612c representing the user profiles and the generated image collages 614a, 614b, 614c are generated for display, thereby enabling a user to easily see a summary of what content items the different user profiles have been consuming. In this example, the image collage 614a comprises only images associated with content items that are "children-friendly" because the user profile associated with that image collage is a "Kids" (or, in other examples, a "Child's") user profile. Image collage 614b comprises an image that has been replaced with text 616a. This may be useful, for example, for enabling a reference to a content item to be included in the image collage, but for which a suitable image (e.g., one that is suitable for all audiences) has not been found. Image collage 614c comprises a space 616c, in which an image has not been generated, based on a user preference. In some examples, an image may be chosen for a different content item, if a preference precludes images based on a content item from being included in the image collage.

In some examples, the accessed 604 preference may be associated with a user profile. In other examples, a user of the smart television 600 may be identified, and a preference associated with the user may be accessed 604. A user may be identified as a person holding a remote control associated with the smart television via, for example, processing of data captured by one or more sensors associated with the smart television. For example, a camera associated with the smart television may capture an image, and image processing may be used to identify the person that is holding the remote control, for example, using face identification technology to compare a face in the captured image with a representation of a face that is stored with a user profile. In other examples, a user may be identified via a viewing history and/or otherwise via accessed profiles and/or content. In other examples, the preference may indicate that a type of content item may be excluded from an image collage associated with a user profile that is associated with the user and/or from an image collage, or image collages, that are not associated with the user.

In some examples, a hierarchy may be associated with the plurality of profiles. For example, a user profile associated with an adult may have a higher ranking in the hierarchy than a user profile associated with a child, or a primary profile of an account owner may have a higher ranking than other secondary profiles of the account holder or profiles of other friends and/or family. Image collages associated with the profiles higher in the hierarchy (for example, associated with an adult) may be hidden on identifying that a user associated with a user profile lower in the hierarchy (for example, a child) is present in the same room as the smart television (or other computing device). In some examples, rather than hiding an entire image collage, one or more images of an image collage may be hidden on identifying that a user associated with a user profile lower in the hierarchy is present in the same room as the smart television (or other computing device). In another example, image collages may be displayed regardless of a setting associated with a user profile if a user associated with a user profile higher in the hierarchy (for example, an adult) is identified in the same room as the smart television (or other computing device). The smart television, or other computing device, may identify users via a camera, a microphone and/or via communication between the smart television and a computing device associated with a user, for example, via Bluetooth, Wi-Fi and/or near-field communication (NFC) communication between the smart television and a smartphone associated with the user. In another example, the type of user (e.g., adult, or child) and/or the ranking of a user profile may be determined based on a likelihood of a particular user controlling the computing device, such as a smart television, or otherwise accessing the user profiles and/or content. Users may be identified based on a time and/or date, a last profile in use and/or a watch history associated with a profile. For example, the time may be 9 pm, which is associated with a high probability of children being asleep and therefore it is not likely that a child will be using the smart television, or other computing device. In another example, the smart television may be being accessed during a time period, such as the afternoon, that is associated with a child's profile normally accessing content (identified, for example, via a watch history associated with the profile). User profiles may comprise an image, voice recording and/or indication of a device associated with a user in order to aid with identification of a user associated with a user profile.

Figure 7:
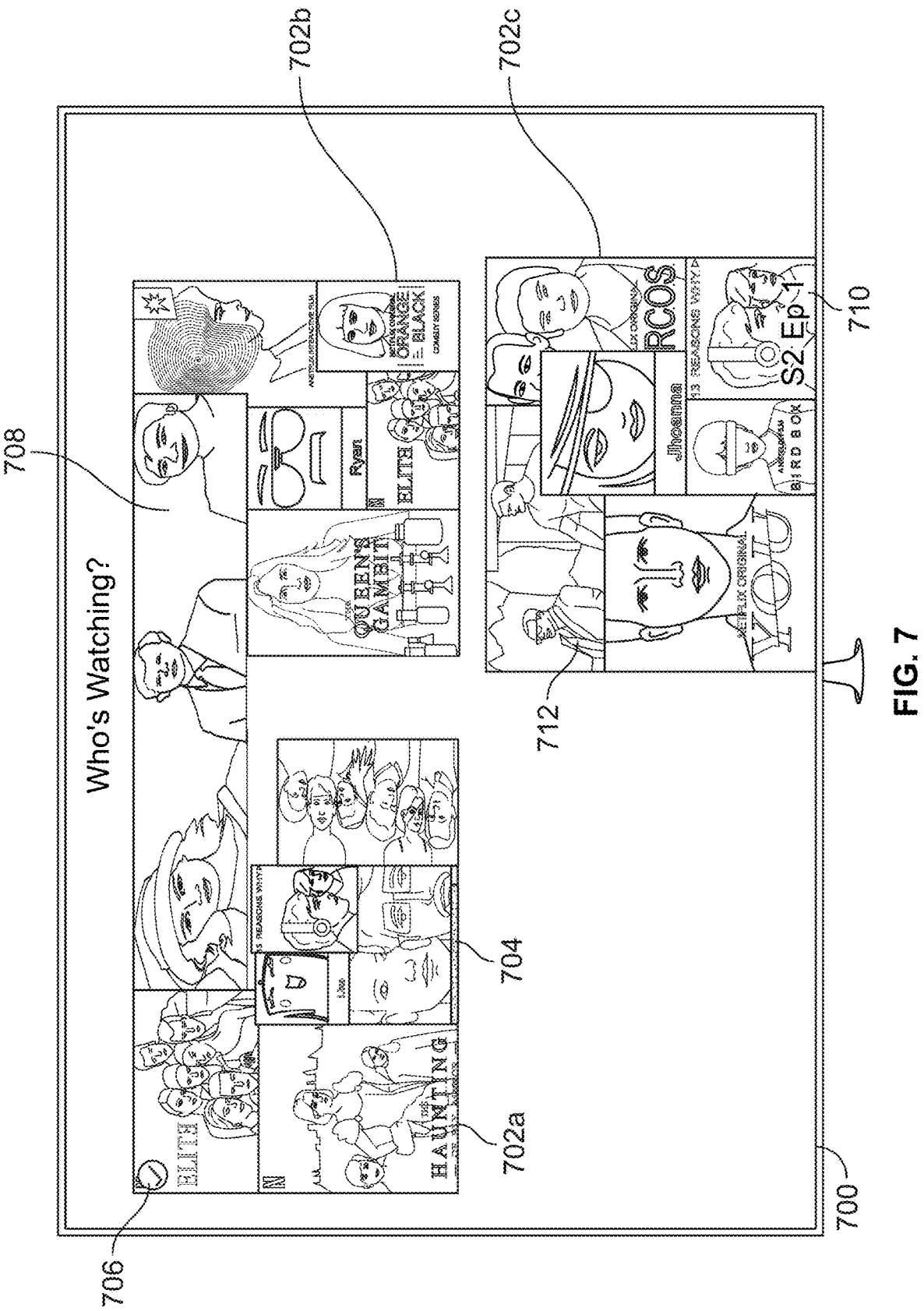
FIG. 7 shows another example environment in which a profile page is customized, in accordance with some embodiments of the disclosure.

FIG. 7 shows another example environment in which a profile page is customized, in accordance with some embodiments of the disclosure. The environment comprises smart television 700, though in other examples the smart television may be any suitable computing device including, for example, a smartphone, a laptop and/or a tablet device. At the smart television 700, a user profile page comprising icons representing the user profiles and generated image collages 702a, 702b, 702c are generated for display, thereby enabling a user to easily see a summary of what content items the different user profiles have been consuming. The image collages 702a, 702b, 702c comprise variations on generating image collages. Image collage 702a comprises a progress bar 704 associated with an image of a content item and a check 706 associated with another image of a content item. The progress bar 704 indicates a viewing progress associated with a content item. The progress bar 704 may indicate viewing progress through a single content item, such as a movie, or, where the content item comprises a series of episodes, the progress bar 704 may indicate progress through a single episode, a season, or, in some examples, through the whole series of seasons. In some examples, one or more images of the image collage may be selectable via an input command, for example, from a remote-control device and/or a touch event on a touchscreen. On receipt of a command for selecting an image associated with a progress bar, the content item associated with the image may resume playing in response to the input command. The check 706 indicates that a content item has been consumed. In some examples, the tick may be applied when a threshold amount of a content item has been consumed, for example 95% of a content item, or greater than 50% of a content item. The check 706 may be associated with a single content item, such as a movie, or, where the content item comprises a series of episodes, the check 706 may indicate progress through a single episode, or, in some examples through the whole series.

Image collages 702a and 702b comprise a shared image 708 of a content item, such that portions of the shared image 708 overlap across or are otherwise included in the image collages 702a, 702b. Image collages may share an image of a content item if, for example, the same content item is identified for two (or more) user profiles, in the manner discussed in connection with FIG. 3 above. In some examples, an additional criterion may be applied, for example, that the user profiles have associated the same, or a similar, ranking with the content item. In some examples, the two rankings may be within a threshold value. The order and/or position of the user profiles may be rearranged in order to enable image collages to share the image. In some examples, an original image may be resized before it is shared between image collages, in order to prevent distortion of the image.

Image collage 702c comprises an indicator of a season and an episode identifier 710, such as a number, associated with an image of a collage item. In some examples, the indicator may comprise only a season identifier or an episode identifier. Image collage 702c also comprises a screenshot 712 of a content item. The screenshot may be captured during a viewing session of the content item or, in other examples, may be obtained via a webservice and/or an API. Any of the aforementioned features, the progress bar 704, the check 706, the shared image 708, the season and episode indicator 710 and/or the screenshot 712 may be combined with one another and/or may be applied to a plurality (including all) of the images of an image collage. An image collage may comprise a combination of the aforementioned features such that, for example, one image may have the check 706 associated with it and another image may have the season and episode indicator 710 associated with it in the same image collage.

In some examples, a first user profile may be linked to one or more other user profiles. If an image collage includes an image of a content item that is being consumed by one or more of the other linked user profiles, an indicator may be applied to the image of the content item. For example, the image collage 702a associated with Liza's profile may comprise an image associated with the series Elite. If Tom's profile is linked to Liza's profile, and Tom's profile is streaming an episode of Elite, then an indicator, indicating that "Tom" is consuming an episode of Elite, may be applied to the image of Elite that is in the image collage 702a associated with Liza's profile. Such an indicator may comprise text "Tom currently watching" and/or an icon associated with Tom's profile.

Figure 8:
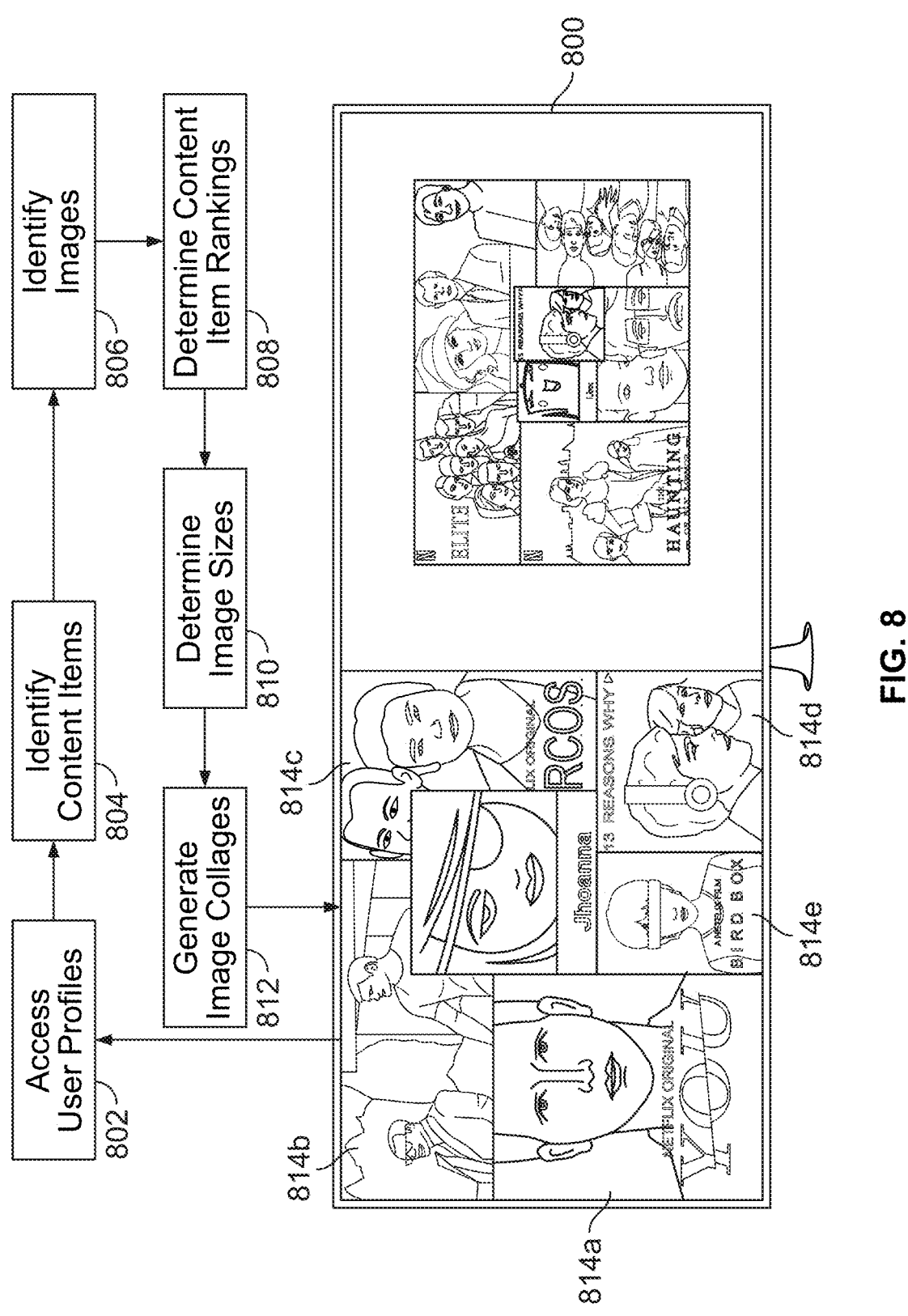
FIG. 8 shows another example environment in which a profile page is customized, in accordance with some embodiments of the disclosure.

FIG. 8 shows another example environment in which a profile page is customized, in accordance with some embodiments of the disclosure. The environment comprises smart television 800, though in other examples the smart television may be any suitable computing device including, for example, a smartphone, a laptop and/or a tablet device. On opening a content item delivery service, such as Netflix, a plurality of user profiles are accessed 802. The user profiles may be stored locally on the smart television 800 or, in other examples, the user profiles may be stored remote from the smart television and accessible via a network, such as the internet, as described below in connection with FIG. 4. On accessing the user profiles, content items are identified 804 for each of the user profiles.

On identifying the content items for each of the user profiles, images associated with the content items are identified 806. A content item ranking is determined 808 for each of the content items. The rankings may be based on, for example, whether a content item is being consumed (e.g., halfway through a season), or has recently been consumed. In other examples, a user may indicate that they intend to consume a new season of a content item, in which case the ranking may be based on this indication. In other examples, image processing may be used to analyze images of a user when they are viewing a content item in order to determine an excitement, or interest, level associated with a content item. Such images may be captured by, for example, a camera integral to the smart television 800, a camera integral to a smartphone that is linked to the user profile and/or via an internet-of-things (IoT) camera that is associated with the user profile. In other examples, output from a smart health monitoring device that is associated with the user profile may be used to determine an excitement, or interest, level associated with a content item. The ranking may be based on the determined excitement, or interest, level. In other examples, the ranking may be based on generated metadata from the content item delivery service application, or metadata accessed from a webservice and/or via an API. In other examples, a trained algorithm may automatically determine content items' rankings. In some examples, content items that are identified as being "binge-watched" may have a higher ranking associated with them. In other examples, content items may be ranked based on a link between the user profile and a particular content item and/or actor. This link may be, for example, a "like" for a particular content item and/or actor, an alert and/or reminder for a particular content item, a content item that has been added to a watchlist, and/or based on whether a particular content item is trending.

For each image to be included in the image collage, an image size is determined 810. For example, the higher the ranking, the larger the image. In some examples, the image collage has a number of preset image sizes, for example, five image sizes. In this case, five content items would be identified, and the identified images would be resized based on the preset image size. In other examples, the image resizing may be dynamic, such that if the highest ranking is twice that of the lowest ranking, the largest image would be twice that of the smallest image. In other examples, a dynamic image resizing may take place, but with additional constraints that ensure the images fit into the image collage, with minimal space to fill with a background color (or image). In some examples, the images may be arranged according to the "golden ratio," or substantially according to the "golden ratio."

On identifying the images associated with the identified content items, and determining the image sizes, image collages for each of the user profiles are generated 812. At the smart television 800, a user profile page, comprising icons representing the user profiles, and the generated image collages are generated for display. In this example, the image 814a of the image collage is larger than image 814b, which is larger than image 814c, which in turn is larger than image 814d, which is larger than image 814e of the image collage. The image sizes represent the determined content rankings, thereby enabling a user to easily see a summary of what content items the different user profiles have been consuming and how they are ranked.

Figure 9:
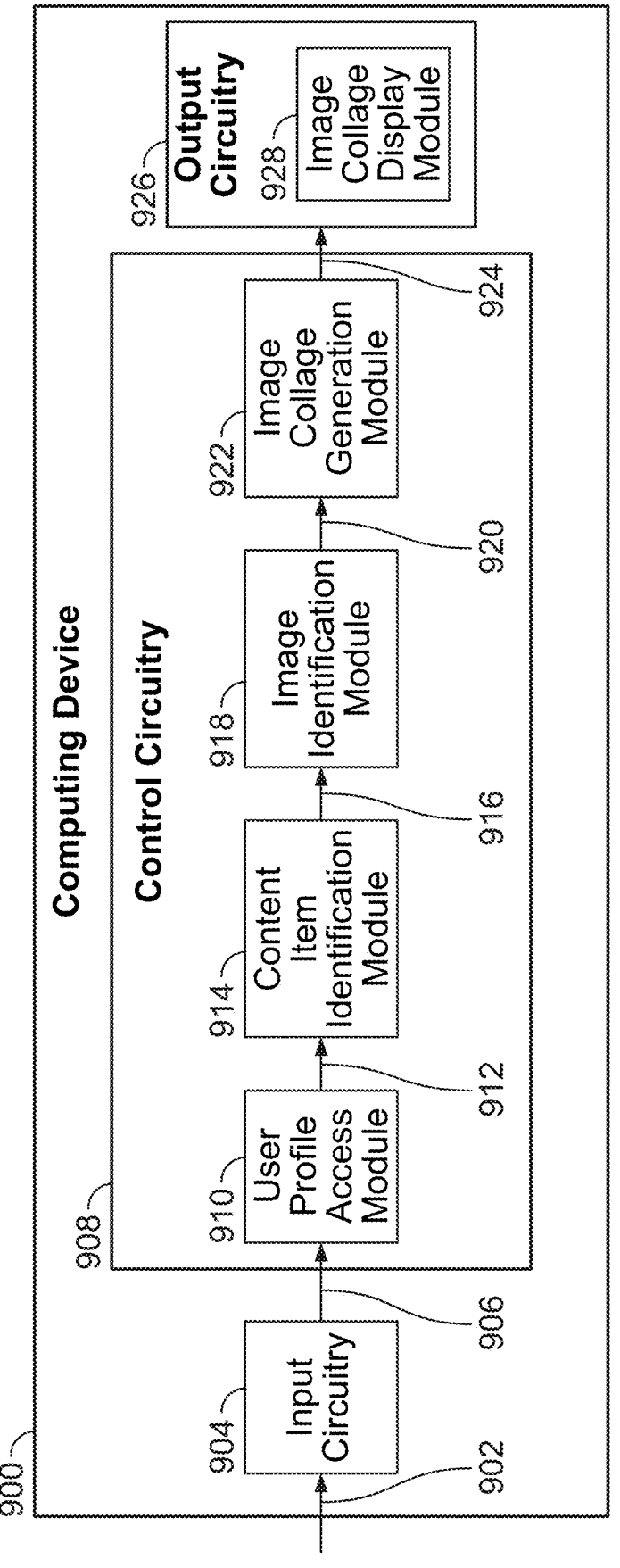
FIG. 9 shows a block diagram representing components of a computing device and data flow therebetween for customizing a profile page, in accordance with some embodiments of the disclosure.

FIG. 9 shows a block diagram representing components of a computing device and data flow therebetween for customizing a profile page, in accordance with some embodiments of the disclosure. Computing device 900 (e.g., smart television 300, 400, 600, 700, 800) as discussed above comprises input circuitry 904, control circuitry 908 and output module 926. Control circuitry 908 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received by the input circuitry 904. The input circuitry 904 is configured to receive inputs related to a computing device. For example, this may be via an infrared controller, a Bluetooth and/or Wi-Fi controller of the computing device 900, a touchscreen, a keyboard, a mouse and/or a microphone. In another example, the input may comprise instructions received via another computing device. The input circuitry 904 transmits 906 the user input to the control circuitry 908.

The control circuitry 908 comprises a user profile access module 910, a content item identification module 914, an image identification module 918, and an image collage generation module 922. The input is transmitted 906 to the user profile access module 910, where a user profile is accessed, for example a user profile associated with a content item deliver service. On accessing the user profile, an indication of the user profile is transmitted 912 to the content item identification module 914, where content items associated with the user profile are identified. An indication of the identified content items is transmitted 916 to the image identification module 918, where images associated with the identified content items are identified. The identified images are transmitted 920 to the image collage generation module 922, where an image collage is generated. The generated image collage is transmitted 924 to the output circuitry 926, where the image collage is generated for display by the image collage display module 928.

Figure 10:
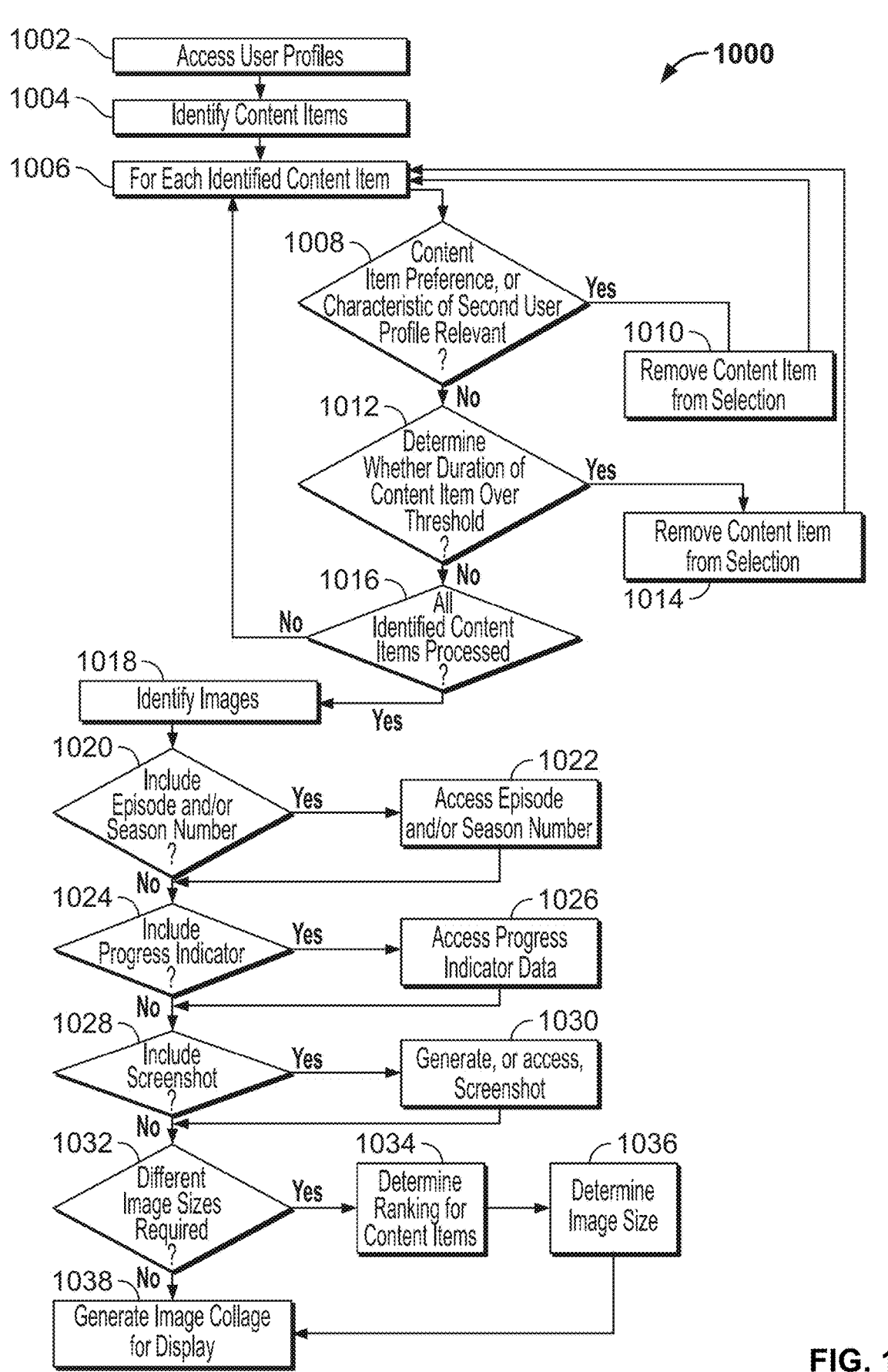
FIG. 10 shows a flowchart of illustrative steps involved in customizing a profile page, in accordance with some embodiments of the disclosure.

FIG. 10 shows a flowchart of illustrative steps involved in customizing a profile page, in accordance with some embodiments of the disclosure. Process 1000 may be implemented on any of the aforementioned computing devices (e.g., smart television 300, 400, 600, 700, 800). In addition, one or more actions of the process 1000 may be incorporated into or combined with one or more actions of any other process or embodiments described herein.

At 1002, user profiles are accessed, for example user profiles associated with a content item delivery service on initiation of an application associated with the service. At 1004, content items associated with the user profiles are identified. A loop starts at 1006 where, for each of the identified content items, it is determined, at 1008, whether a content item preference, or a characteristic of a second user profile is relevant. For example, a user may indicate that content items of a certain genre should not be included in the collage, or a child's profile is be present, again indicating that content items of a certain genre should not be included in the collage. At 1010, if the content item meets a criterion to be removed from selection, it is removed from selection and the system progresses to the next content item. If the content item meets the criteria at 1008, at 1012 it is determined whether the duration of the content item is over a threshold duration. At 1014, if the duration of the content item is over the threshold duration, it is removed from selection and the system progresses to the next content item. If the content item meets the criteria at 1008 and 1012, it is determined whether there are any more content items to be processed at 1016. If there are, the system progresses onto the next content item, restarting the loop at 1006. If not, the system progresses to 1018, where images associated with the content items are identified. At 1020, it is determined whether an episode and/or season identifier, such as a number, should be included in the image collage for a content item. If an episode identifier and/or season identifier should be included, the episode identifier and/or season identifier is accessed at 1022. At 1024, it is determined whether a progress indicator should be included in the image collage for a content item. If it should be included, data enabling the progress indicator to be generated is accessed at 1026. At 1028, it is determined whether a screenshot from the content item should be included in the image collage. If a screenshot should be included, it is generated, or accessed, at 1030. At 1032, it is determined whether different images sizes are required for the image collage. If different image sizes are required, a content item ranking is determined at 1034 and an image size is determined at 1036. The image collage is generated for display at 1038.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be example and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

accessing, by a computing device, a first user profile associated with first user on a social media website;

receiving input associated with the first user profile, wherein the input is for generating new content on the social media website;

identifying, in the new content, a mention of a second user and a content item delivery service;

accessing a second user profile associated with the second user;

identifying, based on the content item delivery service, a first plurality of content items associated with the first user profile;

identifying, based on the content item delivery service, a second plurality of content items associated with the second user profile;

selecting, based on the first user profile and the second user profile, a first subset of content items of the first plurality of content items and a second subset of content items of the second plurality of content items;

for each content item of the first subset of content items, identifying an image associated with the content item;

for each content item of the second subset of content items, identifying an image associated with the content item;

generating, based on the identified images, a first image collage for the first user profile and a second image collage for the second user profile; and generating, for display, the first image collage, the second image collage and the new content.

2. The method of claim 1, further comprising accessing a preference associated with the first user profile, wherein:

the preference indicates a type of content item to be excluded from the first image collage; and selecting the first subset of content items further comprises selecting the first subset of content items based on the preference.

3. The method of claim 1, the method further comprising:

identifying a hierarchy associated with the first user profile and the second user profile;

identifying whether the first user associated with the first user profile is proximate the computing device; and, on identifying that the first user is proximate the computing device:

hiding one of the first or second image collages based on the hierarchy.

4. The method of claim 1, further comprising:

for each content item of the first plurality of content items, determining an associated consumption duration;

for each consumption duration, comparing the determined consumption duration to a threshold value; and wherein:

selecting the first subset of content items is further based on the respective consumption duration of a content item exceeding the threshold value.

5. The method of claim 1, further comprising:

identifying a shared content item that is in both the first and the second subset of content items;

dividing the image associated with the shared content item into three portions; and wherein:

generating the first image collage for the first user profile and the second image collage for the second user profile further comprises:

generating the first image collage based on a first portion of the image; and generating the second image collage based on a second portion of the image; and generating the first and second image collages for display further comprises arranging the first image collage, the second image collage and a third portion of the image to reproduce the image associated with the shared content item.

6. The method of claim 1, further comprising:

accessing, based on a content item of the first subset of content items, a season and/or episode identifier; and generating an indication of the season and/or episode identifier; and wherein:

generating the first image collage further comprises generating the first image collage based on the indication of the season and/or episode identifier.

7. The method of claim 1, further comprising:

accessing, via the first user profile and based on a content item of the first subset of content items, data associated with progress through a content item; and generating a progress indicator based on the data; and wherein:

generating the first image collage further comprises generating the first image collage based on the progress indicator.

8. The method of claim 1, further comprising:

generating, based on a content item of the first subset of content items, a screenshot of a portion of the content item; and wherein:

generating the first image collage further comprises generating the first image collage based on the screenshot.

9. The method of claim 1, further comprising:

determining a ranking for each content item of the first subset of content items;

identifying, based on the determined rankings, a size for each of the identified images, and wherein:

generating the first image collage further comprises generating the first image collage based on the identified size for each of the identified images.

10. The method of claim 1, wherein identifying the image associated with the content item for each content item of the first subset of content items further comprises requesting the image from the content item delivery service.

11. A system comprising:

input/output circuitry configured to:

access, by a computing device, a first user profile associated with first user on a social media website; and processing circuitry configured to:

receive input associated with the first user profile, wherein the input is for generating new content on the social media website;

identify, in the new content, a mention of a second user and a content item delivery service;

access a second user profile associated with the second user;

identify, based on the content item delivery service, a first plurality of content items associated with the first user profile;

identify, based on the content item delivery service, a second plurality of content items associated with the second user profile;

select, based on the first user profile and the second user profile, a first subset of content items of the first plurality of content items and a second subset of content items of the second plurality of content items;

for each content item of the first subset of content items, identify an image associated with the content item;

for each content item of the second subset of content items, identify an image associated with the content item;

generate, based on the identified images, a first image collage for the first user profile and a second image collage for the second user profile; and generate, for display, the first image collage, the second image collage and the new content.

12. The system of claim 11, further comprising processing circuitry configured to access a preference associated with the first user profile, wherein:

the preference indicates a type of content item to be excluded from the first image collage; and the processing circuitry configured to select the first subset of content items is further configured to select the first subset of content items based on the preference.

13. The system of claim 11, wherein the system further comprising processing circuitry configured to:

identify a hierarchy associated with the first user profile and the second user profile;

identify whether the first user associated with the first user profile is proximate the computing device; and, on identifying that the first user is proximate the computing device:

hide one of the first or second image collages based on the hierarchy.

14. The system of claim 11, further comprising processing circuitry configured to:

for each content item of the first plurality of content items, determining an associated consumption duration;

for each consumption duration, comparing the determined consumption duration to a threshold value; and wherein:

the processing circuitry configure to select the first subset of content items is further configured to select the first subset of content items based on the respective consumption duration of a content item exceeding the threshold value.

15. The system of claim 11, further comprising processing circuitry configured to:

identify a shared content item that is in both the first and the second subset of content items;

divide the image associated with the shared content item into three portions; and wherein:

the processing circuitry configured to generate the first image collage for the first user profile and the second image collage for the second user profile is further configured to:

generate the first image collage based on a first portion of the image; and generate the second image collage based on a second portion of the image; and the processing circuitry configured to generate the first and second image collages for display is further configured to arrange the first image collage, the second image collage and a third portion of the image to reproduce the image associated with the shared content item.

16. The system of claim 11, further comprising processing circuitry configured to:

access, based on a content item of the first subset of content items, a season and/or episode identifier; and generate an indication of the season and/or episode identifier; and wherein:

the processing circuitry configured to generate the first image collage is further configured to generate the first image collage based on the indication of the season and/or episode identifier.

17. The system of claim 11, further comprising processing circuitry configured to:

access, via the first user profile and based on a content item of the first subset of content items, data associated with progress through a content item; and generate a progress indicator based on the data; and wherein:

the processing circuitry configured to generate the first image collage is further configured to generate the first image collage based on the progress indicator.

18. The system of claim 11, further comprising processing circuitry configured to:

generate, based on a content item of the first subset of content items, a screenshot of a portion of the content item; and wherein:

the processing circuitry configured to generate the first image collage is further configured to generate the first image collage based on the screenshot.

19. The system of claim 11, further comprising processing circuitry configured to:

determine a ranking for each content item of the first subset of content items;

identify, based on the determined rankings, a size for each of the identified images, and wherein:

the processing circuitry configured to generate the first image collage is further configured to generate the first image collage based on the identified size for each of the identified images.

20. The system of claim 11, wherein the processing circuitry configured to identify the image associated with the content item for each content item of the first subset of content items is further configured to request the image from the content item delivery service.

* * * * *